(12) United States Patent
Smith et al.

(10) Patent No.: US 7,894,588 B2
(45) Date of Patent: Feb. 22, 2011

(54) TELEPHONE CALL HANDLING LIST FOR MULTIPLE USERS

(75) Inventors: Michael Smith, Nova Scotia (CA); William P. McMullin, Nova Scotia (CA)

(73) Assignee: AOL Inc., Dulles, VA (US)

( * ) Notice: Subject to any disclaimer, the term of this patent is extended or adjusted under 35 U.S.C. 154(b) by 1762 days.

(21) Appl. No.: 11/016,962

(22) Filed: Dec. 21, 2004

(65) Prior Publication Data

US 2006/0147014 A1 Jul. 6, 2006

(51) Int. Cl.
*H04M 3/42* (2006.01)
*H04M 15/00* (2006.01)

(52) U.S. Cl. .............................. 379/210.02; 379/112.04

(58) Field of Classification Search ............... 379/210.2, 379/210.03, 112.04
See application file for complete search history.

(56) References Cited

U.S. PATENT DOCUMENTS

| | | | |
|---|---|---|---|
| 5,329,578 A | | 7/1994 | Brennan et al. |
| 5,375,161 A | | 12/1994 | Fuller et al. |
| 5,463,683 A | * | 10/1995 | Collins et al. .......... 379/210.02 |
| 5,495,521 A | * | 2/1996 | Rangachar ............... 379/93.04 |
| 5,502,759 A | * | 3/1996 | Cheng et al. ............. 379/88.02 |
| 5,524,145 A | * | 6/1996 | Parker .................... 379/210.02 |
| 5,537,467 A | | 7/1996 | Cheng et al. |
| 5,548,636 A | | 8/1996 | Bannister et al. |
| 5,557,659 A | | 9/1996 | Hyde-Thomson |
| 5,633,919 A | * | 5/1997 | Hogan et al. ........... 379/115.01 |
| 5,651,054 A | | 7/1997 | Dunn et al. |
| 5,805,587 A | | 9/1998 | Norris et al. |
| 5,809,128 A | | 9/1998 | McMullin |
| 5,848,134 A | | 12/1998 | Sekiguchi et al. |

(Continued)

FOREIGN PATENT DOCUMENTS

WO      WO 00/60809      10/2000

OTHER PUBLICATIONS

Anonymous: "Does the Internet Have Call Waiting?", Internet Document, [Online] Copyright 2002, Tech TV, Inc., pp. 1-2, Retrieved from the Internet: www.techtv.com/screensavers/print/0,23102,2256423,00.html, [retrieved on Nov. 1, 2004].

(Continued)

*Primary Examiner*—Fan Tsang
*Assistant Examiner*—Solomon Bezuayehu
(74) *Attorney, Agent, or Firm*—Finnegan, Henderson, Farabow, Garrett & Dunner, L.L.P.

(57) ABSTRACT

Enabling handling of incoming phone calls includes receiving an indication from one or more call recipients reflecting a desire to block future calls from a call source. A number of received indications reflecting a desire to block future calls from the call source is determined and compared to a threshold. An identifier of the call source is added to a list of call sources from which future calls are specially handled when the number of indications meets the threshold. Handling an incoming call from an undesired call source includes receiving an indication of a call placed to a call recipient. A source of the call is identified. Whether the identified call source is included in the list of call sources from which future calls are specially handled is determined. Special handling is applied to the call when the identified call source is included in the list.

4 Claims, 11 Drawing Sheets

U.S. PATENT DOCUMENTS

| | | | |
|---|---|---|---|
| 5,894,504 A | 4/1999 | Alfred et al. | |
| 6,023,723 A | 2/2000 | McCormick et al. | |
| 6,215,857 B1 | 4/2001 | Kasiviswanathan | |
| 6,295,341 B1 | 9/2001 | Muller | |
| 6,301,609 B1 | 10/2001 | Aravamudan et al. | |
| 6,421,709 B1* | 7/2002 | McCormick et al. | 709/206 |
| 6,463,145 B1 | 10/2002 | O'Neal et al. | |
| 6,477,246 B1 | 11/2002 | Dolan et al. | |
| 6,496,501 B1 | 12/2002 | Rochkind et al. | |
| 6,618,600 B1* | 9/2003 | Chow et al. | 455/567 |
| 6,671,365 B2 | 12/2003 | Kemppainen | |
| 6,738,461 B2 | 5/2004 | Trandal et al. | |
| 6,990,187 B2* | 1/2006 | MacNamara et al. | 379/210.02 |
| 7,085,358 B2* | 8/2006 | Ruckart | 379/88.19 |
| 2002/0012426 A1* | 1/2002 | Gupton | 379/210.02 |
| 2002/0196913 A1* | 12/2002 | Ruckart | 379/88.19 |
| 2003/0133558 A1 | 7/2003 | Kung et al. | |
| 2003/0156700 A1* | 8/2003 | Brown et al. | 379/210.02 |
| 2004/0114747 A1* | 6/2004 | Trandal et al. | 379/211.02 |
| 2004/0213396 A1* | 10/2004 | MacNamara et al. | 379/210.02 |
| 2004/0234062 A1* | 11/2004 | Jones | 379/210.02 |
| 2005/0117730 A1* | 6/2005 | Mullis et al. | 379/210.02 |
| 2005/0271196 A1* | 12/2005 | Florkey et al. | 379/210.02 |

OTHER PUBLICATIONS

Anoymous: "Did Someone Just Call You?", Internet Document, [Online] Copyright 2002, CallWave, Inc., p. 1, Retrieved from the Internet: www.callwave.com, [retrieved on Nov. 1, 2004].

Anonymous: "Internet Answering Machine™ Software", Internet Document, [Online] Copyright 2002, CallWave, Inc. pp. 1-2, [Retrieved from the Internet: www.callwave.com/findoutmore. asp?ct=hp1_fom, Nov. 1, 2004].

Rick James: "Finally! Interactive 'Call Waiting' While You're Surfing?", Internet Document, [Online], pp. 1-4, Retrieved from the Internet: www.monitor.ca/monitor/issues/vol4iss12/feature7.html, [retrieved on Dec. 21, 2004].

International Search Report, Application Serial No. PCT/US05/45664, dated Sep. 21, 2006, 12 pages.

* cited by examiner

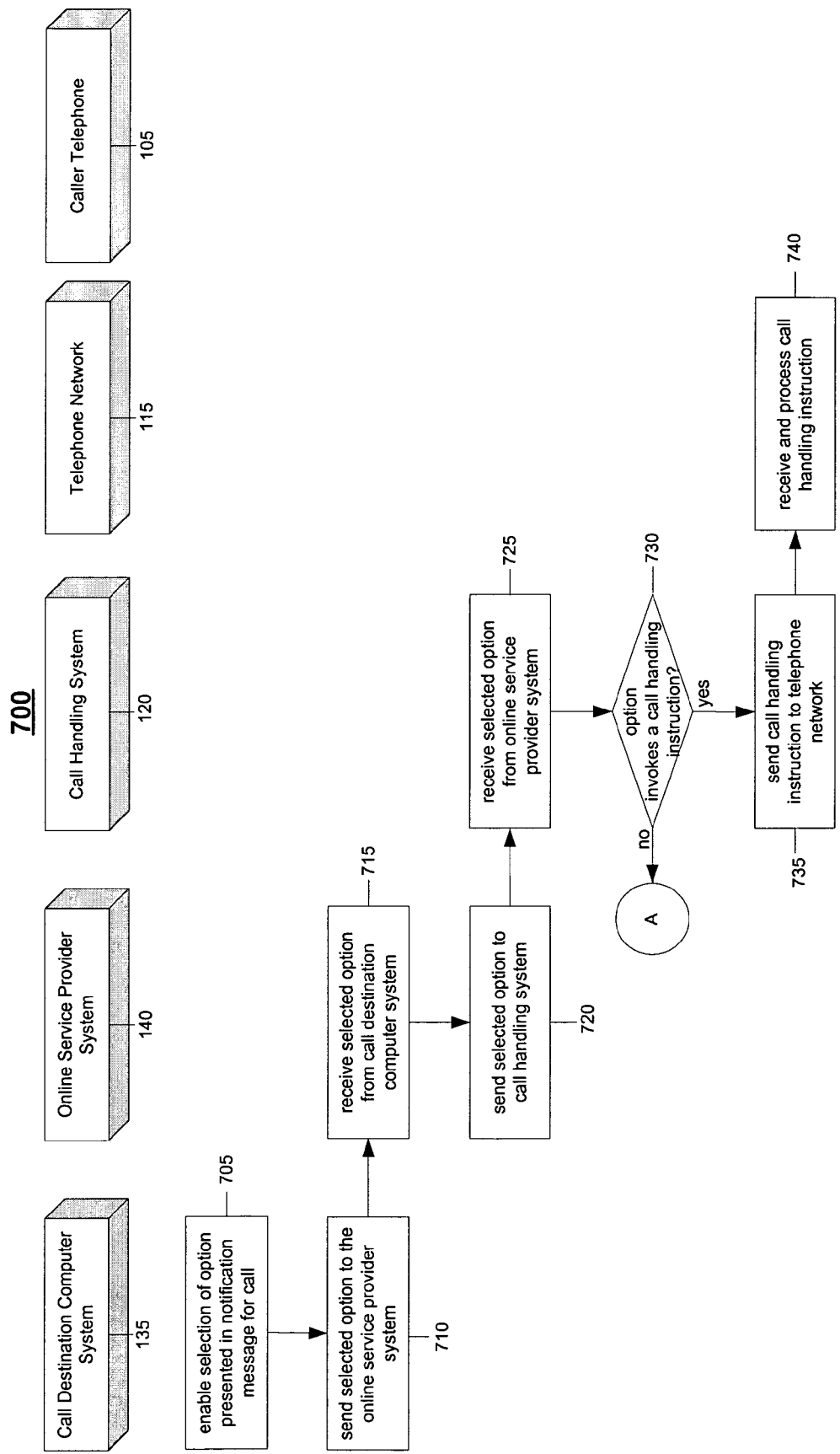

TELEPHONE CALL HANDLING LIST FOR MULTIPLE USERS

TECHNICAL FIELD

This document relates to creating a list of call sources whose calls are handled specially and allowing the list to be used by multiple recipients of the calls.

BACKGROUND

Telephone call recipients may block calls from undesirable call sources, such as telemarketers, on a national or individual level. For example, calls from call sources nationally recognized as typically undesirable may be blocked for call recipients that are registered with the National Do Not Call Registry. The National Do Not Call Registry blocks calls from the recognized call sources to all registered call recipients. The call recipients may add call sources to the National Do Not Call Registry, which results in calls from the added call sources being blocked for all registered recipients. In addition, an individual recipient may specify call sources whose calls are blocked only for the individual recipient.

SUMMARY

In one general aspect, enabling handling of incoming phone calls includes receiving an indication from one or more call recipients reflecting a desire to block future calls from a call source. A number of received indications reflecting a desire to block future calls from the call source is determined, and the number of indication is compared to a threshold. An identifier of the call source is added to a list when the number of indications meets the threshold. A determination of how to handle an incoming phone call from the call source based on whether the call source is included in the list is enabled.

Implementations may include one or more of the following features. For example, the indication may be received in response to a call to the one or more call recipients from the call source.

Enabling a determination of how to handle an incoming phone call from the call source may include enabling the phone call to be blocked when the call source is included in the list.

The identifier of the call source may include a phone number of the call source.

Receiving an indication reflecting the desire of the one or more call recipients to block calls from the call source may include enabling presentation of a user interface that presents calls from the call source to one or more of the call recipients. The indication may be received from the user interface. Receiving the indication from the user interface presented to a recipient may include receiving the indication from an online service provider system that provides the user interface to the recipient. The user interface may make perceivable a log of calls received by the recipient, or a notification of an incoming call to the recipient from the call source.

Receiving an indication reflecting the desire of the one or more call recipients to block calls from the call source may include receiving the indication from phones used by recipients of calls from the phone number.

Adding the call source to the list may include identifying an appropriate category for the call source, and adding the call source to the appropriate category. Identifying an appropriate category for the call source may include retrieving an indication of the appropriate category from the indication reflecting the desire to block future calls from the call source. The appropriate category may be a category of call sources from which future calls are blocked for a single recipient of the calls, or a category of call sources from which future calls are blocked for a group of recipients of the calls.

An indication may be received from one of the call recipients of times when phone calls from the call source are to be handled. The indication of the times may be associated with the call source in the list. Receiving an indication from one of the call recipients of times when phone calls from the call source are to be handled may include receiving an indication of times when phone calls from the call source are to be handled from a user interface presented to a recipient of the calls from the phone number. Receiving the indication of the times from the user interface presented to the recipient may include receiving the indication of the times from an online service provider system that provides the user interface to the recipient.

In another general aspect, handling an incoming call from an undesired call source includes receiving an indication of a call placed to a call recipient. A source of the call is identified. Whether the identified call source is included in a list of call sources from which future calls are specially handled is determined. Special handling is applied to the call when the identified call source is included in the list. A call source is added to the list of call sources after a number of received indications reflecting a desire of corresponding call recipients to block future calls from the call source exceeds a threshold number.

Implementations may include one or more of the following features. For example, applying special handling to the call may include blocking the call, or forwarding the call to the call recipient with additional information identifying the call as originating from a call source included in the list. The additional information may cause the call to ring differently on a phone used by the call recipient than calls originating from call sources not included in the list. The additional information may include the number of indications reflecting a desire of the corresponding call recipients to block future calls from the call source that have been received. The additional information may be presented to the call recipient. Presenting the additional information may include presenting the additional information in a notification that the call originated from a call source included in the list.

The call may be forwarded with additional information identifying the call as originating from a call source not included in the list for which at least one indication reflecting the desire of the corresponding call recipients to block future calls from the call source has been received. The additional information may include a number of indications reflecting the desire of the corresponding call recipients to block future calls from the call source that have been received. The additional information may cause the call to ring differently on a phone used by the call recipient than calls originating from other call sources not included in the list. The additional information may be presented to the call recipient. Presenting the additional information may include presenting the additional information in a notification that the call originated from a call source for which at least one indication has been received.

Applying special handling to the call when the call source is included in the list may include identifying a category within the list of call sources that includes the call source. Special call handling may be applied to the call when the call recipient corresponds to the identified category of the list.

Applying special handling to the call when the call source is included in the list may include determining if a time at which the call is received is a time at which special handling is to be applied to calls from the call source. The special handling may be applied to the call when the time at which the call is received is a time at which the special handling is to be applied to the calls.

Applying special handling to the call may include playing an audio message for the call source indicating that special handling is being applied to the call. Playing the audio message for the call source may include playing an audio message for the call source that informs that call source that future phone calls from the call source will be blocked.

The call recipient may be notified that the special handling has been applied to the call.

Identifying a source of the call may include identifying a phone number from which the call was placed. Determining if the identified call source is included in the list may include determining if the identified phone number is included in a list of phone numbers of call sources from which future calls are to be blocked A user interface may be presented to the call recipient that presents indications of calls placed to the call recipient and enables the call recipient to generate indications that future calls from the sources of the presented calls are to be blocked. The user interface may make perceivable a log of calls received by the call recipient, or a notification of incoming calls placed to the call recipient.

An indication reflecting a desire of corresponding call recipients to block future calls may be received from the call source from a phone used by the call recipient.

The call recipient may be notified that the call is being handled regularly when the call source is not included in the list.

The call recipient may be enabled to generate an indication reflecting the desire that future calls from the call source are to be blocked when the call source is not included in the list.

These general and specific aspects may be implemented using a system, a method, or a computer program, or any combination of systems, methods, and computer programs.

Other features will be apparent from the description and drawings, and from the claims.

DESCRIPTION OF DRAWINGS

FIGS. 7A and 7B provide a flow chart of a process for handling a call based on the selection of an option from a notification of the call.

Like reference symbols in the various drawings indicate like elements.

DETAILED DESCRIPTION

A list of call sources whose calls receive special handling is created to indicate a desire to have special handling applied to future calls from the call sources. For example, a user may generate an indication reflecting a desire to block future calls from a call source in response to a call from the call source. The user may generate such an indication because the user believes the call source to be undesirable. When a threshold number of such indications are received from one or more users, the call source is added to the list of call sources. Special handling is applied to future calls from call sources included in the list of call sources. The special handling may result in the future calls being blocked from their intended recipients. Special handling may be applied to a call to a user from which an indication reflecting the desire to block the call was not received. In other words, portions of the list of call sources may be applied to multiple users, some of whom may not have been directly involved in the specification or the creation of the list.

Figure 1:
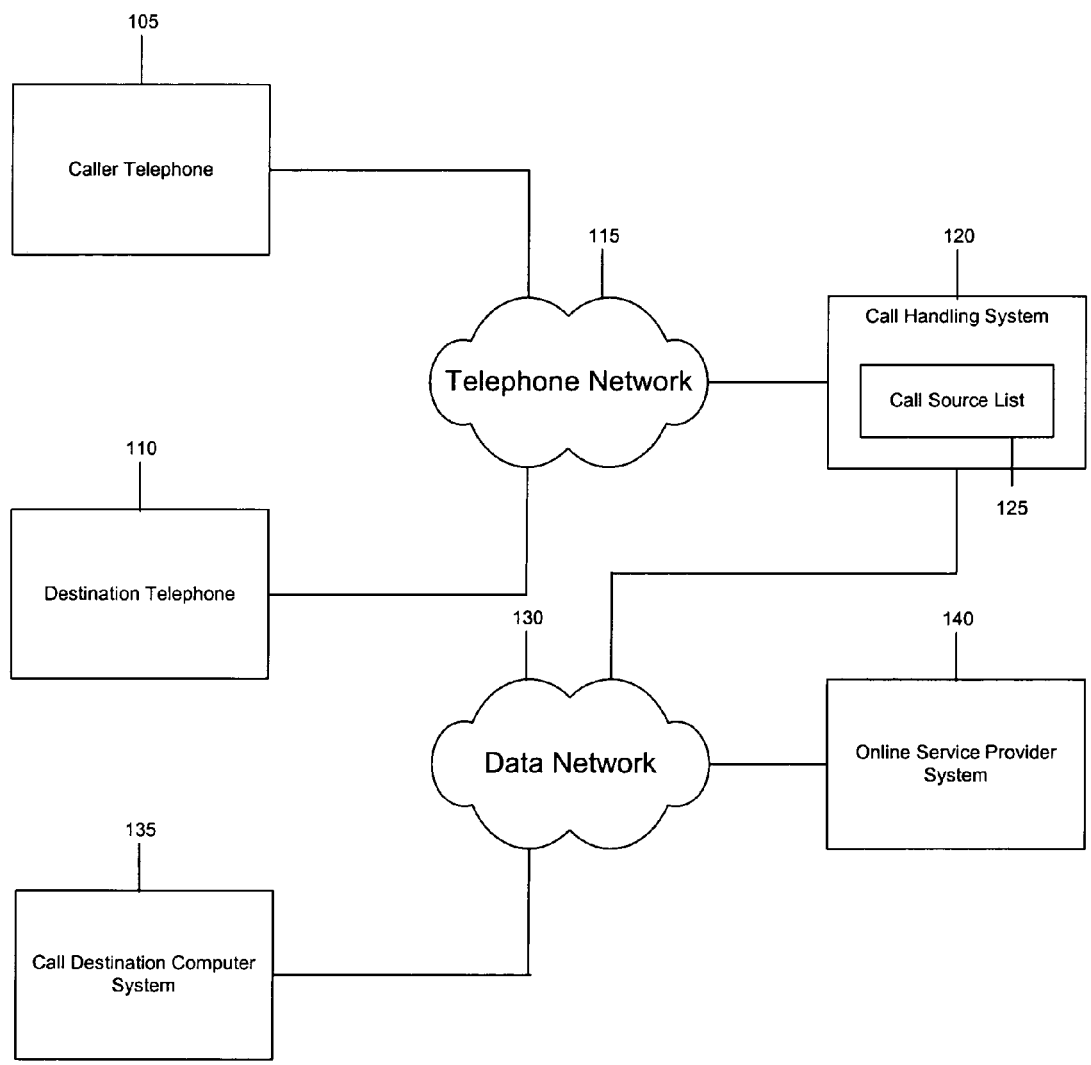
FIG. 1 is a block diagram of a communications system for providing a telephone call handling list for multiple users.

Referring to FIG. 1, a communications system 100 for handling calls from undesirable call sources includes a caller telephone 105, a destination telephone 110, a telephone network 115, a call handling system 120 that includes a call source list 125, a network 130, an online service provider system 140, and a call destination computer system 135.

The caller telephone 105 is configured to place a call to the destination telephone 110 across the telephone network 115. The caller telephone 105 and the destination telephone 110 may be landline phones that allow communications over the telephone network 115. In another implementation, the caller telephone 105 and/or the destination telephone 110 may be a cellular phone or a mobile personal digital assistant (PDA) with embedded cellular phone technology. In yet another implementation, the destination telephone 110 may integrate the call destination computer system 135 and operate as a single computer system.

The telephone network 115 is configured to enable direct or indirect voice communications between the caller telephone 105, the destination telephone 110, and the call handling system 120. The telephone network 115 also may be configured to forward calls between the caller telephone 105 and the destination telephone 110 to a voicemail system, another telephone used by a user of the caller telephone 105 or the destination telephone 110, or another telephone system that may receive the calls. When a user of the caller telephone 105 places a call to the destination telephone 110, the telephone network 115 is configured to forward the call to the call handling system 120. In one implementation, forwarding the call to the call handling system 120 may include sending information describing the call to the call handling system. More particularly, sending information describing the call may include routing a signaling channel of the call to the call handling system 120 while a voice channel of the call is routed directly between the caller telephone 105 and the destination telephone 110.

When the call is forwarded to the call handling system 120, the telephone network 115 is configured to send call-related information to the call handling system 120 over a signaling channel. The call-related information includes call origin and call destination information. The call origin information may include the direct number of the caller telephone 105 and the time and date when the call was initiated, and the call destination information may include the direct number of the destination telephone 110. The call origin information may be delivered, for example, through a service known as Automatic Number Identification (ANI), and the call destination information may be delivered, for example, by extracting called number information from the integrated services digital network (ISDN) call setup or, alternatively, through a service known as Dialed Number Identification Service (DNIS).

The telephone network 115 also is configured to receive call handling instructions from the call handling system 120. The call handling instructions are instructions that tell the telephone network 115 how to process a call. The call handling instructions may include, for example, instructions to accept a call, block a call, or forward a call to another telephone number (e.g., to a telephone number corresponding to a voicemail system or to a different telephone).

The telephone network 115 may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The call handling system 120 is a computer system configured to receive a call from the caller telephone 105 that has been forwarded to the call handling system 120 by the telephone network 115. The call handling system 120 applies special handling to the call when the call is from a call source included in the call source list 125. Call sources are added to the call source list 125 after receipt of a particular number of indications that calls from the call source should be handled specially.

The indications may be received from the identity to whom the call is placed or from other identities associated with the identity to whom the call is placed. For example, an indication that calls from the call source should be handled specially may be received from other identities included in one or more contact lists associated with the identities to whom the call is placed. Therefore, calls from a call source may be specially handled for a user that did not actively indicate that calls from the call source should be specially handled.

More particularly, the call source list 125 may include categories that apply to individual users, to users corresponding to particular accounts, to other groups of users, or to all users. The users corresponding to a category are not required to actively indicate that calls from the call sources in the categories should be handled specially. The call source list 125 may be organized or sorted to facilitate determinations of presence of call sources in the call source list 125. A call source whose calls should be specially handled may be identified in the call source list 125 by a phone number of the call source, a name of the call source, an address of the call source, a location of the call source, or another identifier of the call source.

The call handling system 120 receives the call destination direct number from the telephone network 115, identifies one or more identities associated with the call destination direct number, and handles the call for the identified identities in accordance the call source list 125. The identities associated with the call destination direct number may be identified, for example, by accessing an account record indexed by the call destination direct number and stored in a configuration data store. Alternatively, the account record may be indexed by a name or another identifier of a user of the destination telephone 110 or the call destination computer system 135.

The special handling applied to the call may include blocking the call. The special handling also may include ignoring the call such that the call is not answered and is allowed to continuously ring. Alternatively, a message, such as an audio message, may be sent to the telephone network 115 or the caller telephone 105 to instruct the user of the caller telephone 105 not to call the destination telephone 110 again. An electronic message that inspires an audio message indicating the unavailability of the destination telephone 110 to the caller telephone 105 also may be sent to the telephone network 115.

If the call source is not included in the call source list 125, the call may be handled regularly. For example, the call may be forwarded to the destination telephone 110 or to another number, such as a specified cell phone number or a voicemail number. Notifications of the call may be sent to the identified identities, based on preferences associated with the identified identities in general or individually.

The call handling system 120 processes the call by identifying which identities may receive a call notification message based on the account-level and identity-level call handling preferences. The call handling system 120 requests the online status of the identified identities from the online service provider system 140 and generates call notification messages for each identified identity that is online in accordance with the identity-level preferences. The call handling system 120 sends the call notification messages to the online service provider system 140, which sends the call notification messages, along with format data that indicates how the notification messages are to be displayed, over the network 130 to one or more call destination computer systems 135 for presentation to users. Each user of a call destination computer system 135 selects an option presented in the call notification message, and the selected option is sent to the online service provider system 140 over the network 130. The online service provider system 140 relays the selected option to the call handling system 120, which processes the selected option accordingly.

The call handling system 120 processes a selected option by sending a call handling instruction to the telephone network 115 and/or sending an audio message to the caller telephone 105 over the telephone network 115. The call handling system 120 is configured to record, store, access, and play or redirect audio messages. The audio messages may be personalized by subscribers to the call handling services and may be stored in a data store and indexed, for example, by the number of the destination phone of the subscriber.

The network 130 is configured to enable direct or indirect communications between the call handling system 120, the online service provider system 140, and one or more call destination computer systems 135. Examples of the network 130 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data.

In some implementations, the network 130 and the telephone network 115 are implemented by a single or otherwise integrated communications network configured to enable voice communications between the caller telephone 105, the destination telephone 110, and the call handling system 120, and to enable communications between the call handling system 120, the online service provider system 140, and the one or more call destination computer systems 135.

The online service provider system 140 is a computer system configured to provide online data communications services to users, detect online presence of users of call destination computer systems 135, receive call notification messages from the call handling system 120, generate format data and send the format data along with the call notification messages to call destination computer systems 135, and send selected options from the call destination computer systems 135 to the call handling system 120. The online data communications services may include, for example, e-mail services, instant messaging services, Internet access, and/or access to online content.

The online service provider system 140 may detect online presence of users of call destination computer systems 135 in, for example, a manner similar to that used to detect presence in an instant messaging system and/or in a manner similar to that disclosed in application Ser. No. 10/414,167, which is hereby incorporated by reference in its entirety, and which describes the use of client-side communication device monitors. The online service provider system 140 also is configured to receive call notification messages from the call handling system 120, generate format data that is used to format the call notification message for presentation on the call destination computer systems 135, and send the call notification messages to the call destination computer systems 135 in real time.

The format data may vary based on device type. For example, for a device with limited display capabilities, such as a PDA, the format data may enable the device to limit the call notification message to a visual indication of the incoming call (e.g., illumination of a light and a graphical display of a call icon and the caller phone direct number or identity proxy thereof), and may further limit the call handling options that are presented to the user to a subset of the full suite of options (e.g., the option to forward the call to one other phone number). In contrast, the format data sent to a home computer may enable the home computer to provide, for example, an audio and visual indication of the call and to display full caller identity information including address, return phone number, and other information about the caller accessible based on the caller phone number. The format data sent to the home computer also may enable the home computer to present to the user a significantly larger number of call handling options (e.g., the option to play various audio messages, take a message, and forward the call to a phone number selected by the user from a large number of possible phone numbers).

Since the caller is waiting on the caller telephone 105 during the generation and transmission of call notification messages, the online service provider system 140 is configured to send information to and receive information from the call destination computer systems 135 in real time. For example, the online service provider system 140 also is configured to transmit in real time the selected options from the call destination computer systems 135 to the call handling system 120. Accordingly, the online service provider system 140 may be configured to avoid queuing call notification messages or selected options or to avoid further processing the call notification messages or selected options in any way that increases transmission delay. The online service provider system 140 may be configured to provide this functionality in a manner similar to that used by instant messaging systems, or even to leverage instant messaging systems to enable transmission and receipt of call handling and notification messages as instant messages in real time.

The call destination computer system 135 is configured to receive call notification messages and format data from the online service provider system 140, to process the call notification messages in accordance with the format data to enable a user to perceive the call notification, to accept user selection of one of the options offered by the call notification message, and to send the selected option to the online service provider system 140. The call destination computer system 135 may be a general purpose computer, such as a workstation or a personal computer, a PDA, a special purpose computer, an intelligent mobile phone, a pager, or a set top box. The call destination computer system 135 may include one or more software or hardware applications that command and direct communications between the call destination computer system 135 and the online service provider system 140. The applications may enable digital communications to be received from the online service provider system 140. For example, the applications may include a modified instant messaging application configured to receive notification messages and to send selected options in a manner similar to that used to receive and send instant messages.

In some implementations, the call handling system 120 may be integrated into the call destination computer system 135. In such implementations, the call destination computer system 135 may be connected to the telephone line used by the destination telephone 110, as well as to the network 130. For example, a dongle or some other piece of hardware may be used to connect the call destination computer system 135 to the telephone line in parallel with the destination telephone 110. As another example, the destination telephone 110 may be connected to the telephone line thorough the call destination computer system 135. As a result, calls to the destination telephone 110 also may be received by the call destination computer system 135 and by the call handling system 120 that is integrated into the call destination computer system 135 without the calls being forwarded. The call handling system 120 determines if the call is from an undesirable source, and if so, applies special handling to the call, as is done when the call handling system 120 is a standalone system.

In implementations where the call handling system 120 is integrated into the call destination computer system 135, a local copy of the call source list 125 may be maintained at the call destination computer system 135. A central copy of the call source list 125 may be maintained by the online service provider system 140, and additional undesirable call sources may be added to the central copy of the call source list 125. The call source list 125 may be centrally maintained for distribution to other call destinations for use in blocking calls from undesirable sources identified in the call source list 125. The call source list 125 also may be centrally maintained such that the call source list 125 is not lost if the call destination computer system 125 fails. The call destination system 135 may periodically request an updated copy of the call source list 125 from the online service provider system 140, or the online service provider 140 may periodically provide the call destination system with an updated copy of the call source list 125. The call handling system 120 uses the local copy of the call source list 125 when determining if calls to the destination telephone are from undesirable sources.

Figure 2:
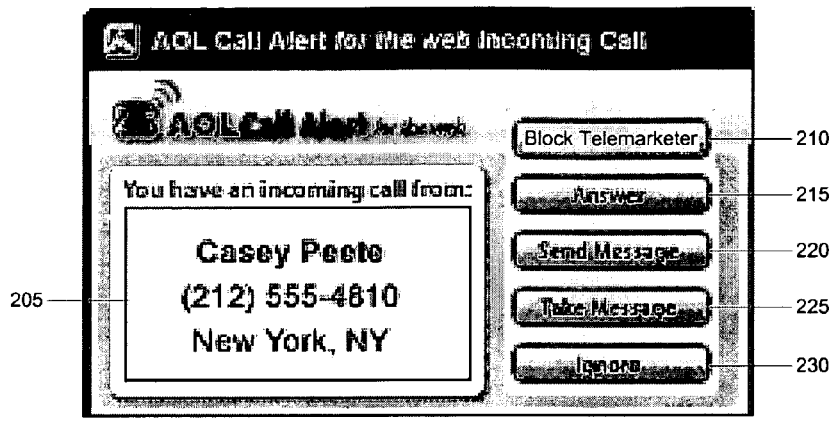
FIG. 2 is an illustration of a notification of an incoming telephone call.

Referring to FIG. 2, a call notification interface 200 may be presented to a user associated with a telephone number to which a call announced by the call notification interface 200 was placed. The call notification interface 200 includes caller identification information 205, a block telemarketer option 210, an answer option 215, a send message option 220, a take message option 225, and an ignore option 230.

The call notification interface 200 may be displayed on a computer system used by the user to access the Internet. The call notification interface 200 may be presented to the user while a destination telephone used by the user is occupied. For example, the user may be using the destination telephone and an associated phone line to connect to the Internet. Alternatively or additionally, the call notification interface 200 may be presented to the user when the call is received, regardless of whether the destination telephone is occupied. In such a case, all calls to the destination telephone are routed both to the computer system and to the destination telephone.

The caller identification information 205 includes information identifying a caller telephone from which the call was placed and a user of the caller telephone. The caller identification information may include a name of the user, a phone number corresponding to the caller telephone or to the user, and a location of the caller telephone or of the user. The location may be a street address or a city and a state that is derived from the phone number included in the caller identification information 205. For example, the phone number, and more particularly the area code of the phone number, may be used to identify the corresponding location.

The block telemarketer option 210 is used to indicate that the user desires to block future calls from the caller telephone and the user of the caller telephone. Selecting the block telemarketer option 210 generates an indication of such a desire that is sent to a call handling system, such as the call handling system 120 of FIG. 1, that maintains a list 125 of sources of calls that are to be blocked. If a particular number of such indications are received, then calls from the caller telephone and the caller may be blocked for other users associated with the user. The block telemarketer option 210 may be selected when the user determines that the caller telephone and the caller represent a telemarketer or another undesirable call source.

In addition to generating the indication when selected, the block telemarketer option 210 may cause a message indicating that the block telemarketer option 210 has been selected to be sent to the caller. The message may be an audio message that may be played for the caller over the caller telephone. Alternatively or additionally, an electronic message, such as an instant message or an e-mail message, may be sent to the caller if addressing information for the electronic message is available. The message also may be included in an interface or a notification presented to the caller on a computer system used by the caller.

The answer option 215 enables the user to indicate that the call is to be received. The user may participate in the call using a microphone and speakers associated with the computer system on which the call notification interface 200 is displayed. Alternatively, the user may use the destination telephone to participate in the call.

Selecting the send message option 220 causes a message to be sent to the caller. The message may indicate that the user is busy, otherwise unavailable to receive the call, or does not desire to receive the call, for example, because the caller is a telemarketer. Like the message sent when the block telemarketer option 210 is selected, the message may be an audio message or an electronic message, or may be included in an interface or a notification that is presented to the caller.

Selecting the take message option 225 causes the call to be forwarded to a voicemail service that then may take a message. Alternatively or additionally, selecting the take message option 225 may activate an answering machine connected to the destination telephone. In either case, the user does not actively participate in the call or in taking the message after selecting the take message option 225.

The ignore option 230 may be selected by the user when the user does not wish to receive the call, for example, because the user does not wish to receive or otherwise handle a call from the caller identified in the caller identification information 205. Selection of the ignore option 230 may cause the call to ring continuously for the caller without providing an indication to the caller that the call is being ignored by the user.

Figure 3:
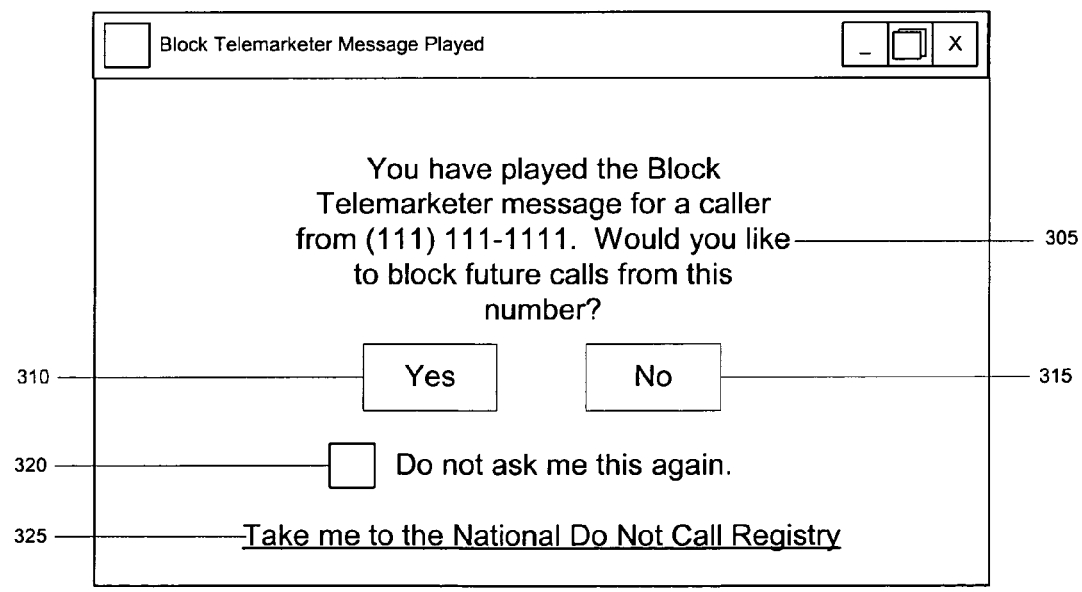
FIG. 3 is an illustration of a notification of a blocked telephone call from a telemarketer.

Referring to FIG. 3, a message notification interface 300 may be presented to a user for which the call notification interface 200 of FIG. 2 was displayed. More particularly, the message notification interface 300 may be displayed for the user after the user selects the block telemarketer option 210 of the call notification interface 200. In some implementations, the message notification interface 300 may be displayed only after the send message option 220 has been selected. The message notification interface 300 includes a message 305, an accept button 310, a reject button 315, an option 320, and a link 325.

The message 305 informs the user that a message indicating that the call was not received because the caller is believed to be a telemarketer has been played for the caller. The message 305 may provide the user with the option of blocking future calls from the caller. In other words, the user is provided with the option of generating an indication of a desire to block future calls from the caller. Selecting the accept button 310 generates such an indication, while selecting the reject button 315 causes the message notification interface 300 to be dismissed without generating such an indication. When the accept button 310 is selected, the generated indication is sent to a call handling system, such as the call handling system 120 of FIG. 1.

When selected the option 320 prevents the message notification interface 300 from being presented to the user in the future. Therefore, selecting the option 320 prevents the user from having the option to indicate the desire to block future calls from the caller when selected. When the accept button 310 is selected after the option 320 is selected, an indication of the desire to block future calls from the caller may be generated automatically without presenting the message notification interface 300.

The link 325 provides the user with access to the National Do Not Call Registry. More particularly, a web site of the National Do Not Call Registry may be displayed for the user in a web browser when the link 325 is selected. The user may view the web site to gather information about the National Do Not Call Registry and to determine whether to register with the National Do Not Call Registry. The web site also may include an indication of whether the caller is a telemarketer and whether other users have indicated the desire to block calls from the caller.

Figure 4:
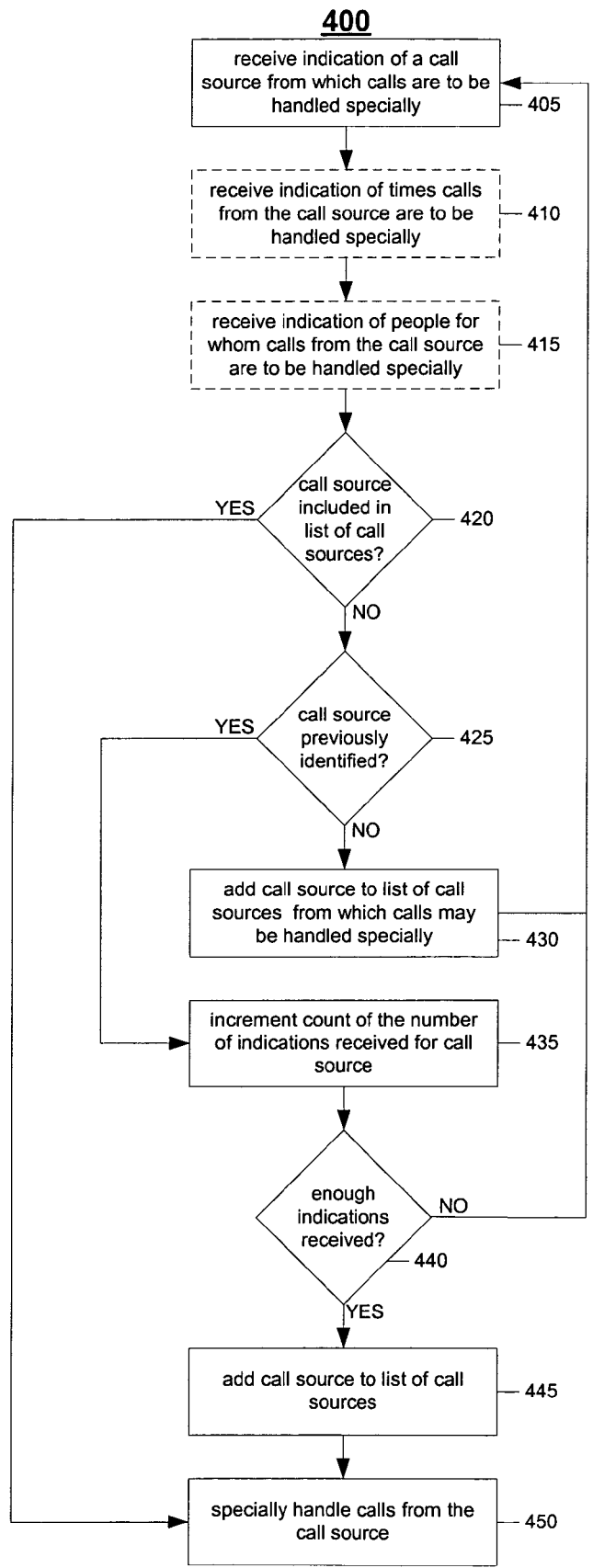
FIG. 4 is a flow chart of a process for specifying a list of call sources whose calls are specially handled for a group of users.

Referring to FIG. 4, a process 400 is used to specify a list of call sources such that special handling may be applied to future calls from the call sources. The list of call sources may be applied to calls to a single user or to a group of associated users. The process 400 is executed by a call handling system, such as the call handling system 120 of FIG. 1, in response to indications of a desire to block future calls from a call source that are received from a destination telephone, such as the destination telephone 110 of FIG. 1, or a computer system at the destination telephone, such as the call destination computer system 135 of FIG. 1.

The process 400 begins when an indication of a call source from which calls are to be handled specially is received (405). The indication may be generated by and received from an interface, such as a log of calls or the notification interfaces 200 and 300 of FIGS. 2 and 3. The interface is displayed on the call destination computer system in response to a call from the call source. Alternatively, the indication may be generated by and received from the destination telephone, for example, after a user of the destination telephone enters a code into a keypad of the destination telephone that causes the indication to be generated.

An indication of times at which calls from the call source are to be handled specially also may be received (410). The indication may be received from an interface presented on the call destination computer system. For example, the indication of the times may specify that calls from the call source are blocked every day from 6:00 P.M. to 8:00 P.M, all day Saturday, and all day Sunday. As another example, the indication may specify that the calls are to be handled specially when a destination phone line for the calls is occupied. In other words, the indications of the times may include actual times for which the calls are to be handled specially or situations or events during which the calls are to be handled specially.

In addition, an indication of people for whom calls from the call source are to be handled specially may be received (415). For example, the calls from the call source may be handled specially for a single user from which the indication of the call source is received, or for multiple users associated with the single user. More particularly, calls may be handled specially for people known to the user, such as people included in a contact list of the single user or people included in a group of the contact list. The indication may specify the people individually by name or another identifier, or by a name of the contact list or the group within the contact list.

A determination of whether the indicated call source is included in the list of call sources that is maintained by the call handling system is made (420). If not, then a determination is made as to whether at least one other indication of the desire to block future calls from the indicated call source has been received (425). In other words, a determination is made as to whether calls from the indicated call source have been identified previously as candidates for special handling. If no previous indications of the call source were received, then the call source is added to a set of call sources whose calls may be handled specially (430). For each call source in the set, a count of the number of indications reflecting the desire to specially handle future calls from the call source is maintained. After the call source is added to the set, processing of the received indication of the call source is complete, and the call handling system waits until another indication of a call source is received.

The call handling system then increments a count of the number of such indications of the call source that have been received (435), and determines whether a number of indications made is sufficient for the call source to be added to the list of call sources (440). For example, a threshold number of indications may be required before the call source is added to the list of call sources. If a sufficient number of indications have not yet been received, processing of the received indication of the call source is complete, and the call handling system waits until another indication of a call source is received.

If enough indications of the call source have been received, then the call source is added to the list of call sources (445). More particularly, an identifier of the call source, such as a phone number of the call source, is added to the list of call sources. In addition, the received indications of times at which special handling is to be applied to the calls from the call source may be associated with the call source in the list. The received indications of people for whom special handling is to be applied to the calls from the call source may be associated with the call source in the list or may be used to identify a category for the call source within the list.

As a result of the call source being added to the list (445) or already being included in the list (420), future calls from the call source are then specially handled. The special handling applied to the future calls from the call source will be described with respect to FIG. 5.

The list of call sources that is maintained with the process 400 may be distributed by the call handling system to other systems that may apply the special handling to the calls from the call sources included in the list. For example, the list may be distributed to destination telephones and call destination computer systems to which the calls are placed. Distributing the list to the destination telephones and the call destination computer systems may make the special handling more reliable because multiple systems are applying the special handling to the calls. More particularly, distributing the list enables the special handling to be applied after failure of the call handling system. Distributing the list also may improve the performance of the call handling system by reducing the responsibilities of the call handling system.

In one implementation, the call handling system maintains three sets of call sources. The first set includes those call sources that have been added to the list of call sources. In other words, the first set is the list of call sources. The second set includes call sources that have not yet been added to the list of call sources and for which at least one indication of a desire to block future calls has been received. The third set includes those calls sources for which no such indications have been received. A call source is initially found in the third set, and may be moved to the second set and then to the first set. The three sets may be color coded. For example, the first set may be given a red color to indicate that calls from the included call sources are blocked. The second set may be given a yellow color to indicate that calls from the included call sources are allowed, but that the calls may not be allowed in the future. The third set may be given a green color to indicate that calls from the included call sources are allowed. Color coding the three sets may be particularly useful when the call sources are presented. For example, a call source may be presented in a color of its corresponding set to indicate whether calls from the call source are or will be blocked or allowed.

Figure 5:
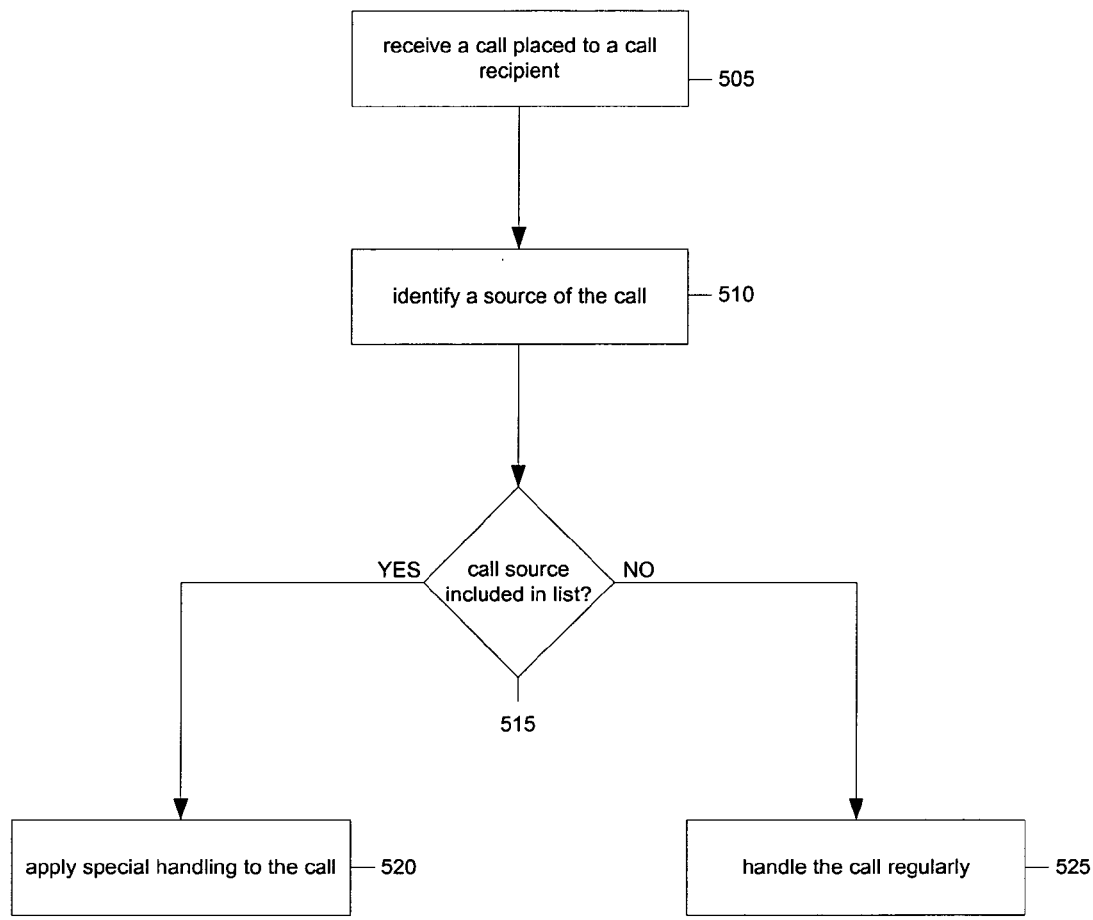
FIG. 5 is a flow chart of a process for handling a telephone call based on whether the call is from a source included in a list of call sources whose calls are handled specially.

Referring to FIG. 5, a process 500 is used to determine whether special handling should be applied to a call placed to a call recipient. The determination is based on whether a call source that placed the call is included in a list of sources of calls to which special handling is to be applied. The process 500 is executed each time a call to the call recipient is placed. The process 500 is executed by a system that maintains the list of call sources. For example, the process 500 may be executed by a call handling system on which the list of call sources was originally specified, such as the call handling system 120 of FIG. 1. Alternatively, the process 500 may be executed by a system used by the call recipient that is capable of applying special handling to the call, such as the destination telephone 110 or the call destination computer system 135, and to which the list of call sources has been provided. Multiple instances of the process 500 may be executed in parallel to apply special handling to calls placed to multiple call recipients.

The process 500 begins when a call to the call recipient is received at the system executing the process 500 (505). For example, all calls to the call recipient may be routed to the system executing the process 500. A source of the call is identified (510). More particularly, an identifier of the call source, such as a phone number of a telephone from which the call was placed, may be identified. The phone number may be identified using the ANI service. The identifier of the call source may be a name of the call source, an address of the call source, or a location of the call source, which may be identified from the phone number of the call source identified using the ANI service.

A determination is made as to whether the call source is included in the list of call sources.(515). In one implementation, the list of call sources includes identifiers of the call sources, and determining whether the identified call source is included in the list of call sources may include determining if the identified identifier of the call source is one of the identifiers included in the list of call sources. In implementations where the list of call sources is separated into categories, a category of the list of call sources that includes the identified call source may be identified. Information associated with the call source in the list, such as times at which, and people for whom, special handling is applied to calls from the call source, also may be identified.

If the call source is included in the list of call sources, then special handling may be applied to the call (520). The special handling may result in the call being blocked from the call recipient. Alternatively, the call may be forwarded to the call recipient with additional information identifying the call as originating from a call source included in the list. The additional information may cause the call to ring differently on a telephone used by the call recipient than other calls from call sources that are not included in the list. The additional information also may indicate the number of received indications that reflect a desire of one or more of the multiple call recipients to block future calls from the call source. The additional information may be presented to the call recipient, for example, in a notification that the call originated from a call source included in the list of call sources.

An audio message indicating that the special handling is being applied to the call may be played for the call source. The audio message may inform the call source that future calls from the call source will be blocked. A notification that the call originated from a call source included in the list of call sources also may be displayed for the call recipient.

If a category for the call source has been identified, then the special handling may be applied to the call only when the call recipient corresponds to the identified category. For example, if the call source is part of a category that corresponds to a particular group of users, special handling may be applied to the call only when the call recipient is a member of the particular group. In addition, if ranges of times at which special handling is applied to calls from the call source are associated with the call source in the list, special handling may be applied to the call only when the time at which the call was placed or received is in one of the associated ranges of times.

However, if the call source is not included in the list of call sources, then the call may be handled regularly (525). In other words, the call simply may be forwarded to the call recipient without restriction. The call recipient may be notified that the call is being handled regularly. If indications reflecting the desire to specially handle future calls from the call source have been received, but the call source has not yet been added to the list of call sources, the call may be forwarded to the call recipient with additional information indicating that the indications have been received but that the call source has not yet been added to the list. The additional information may indicate the number of indications that have been received. The additional information may be presented to the call recipient in a notification of the call that is presented to the call recipient. Alternatively or additionally, the additional information may cause the call to ring differently than other calls on the call recipient's telephone. The call recipient may be enabled to generate an indication reflecting a desire to add the call source to the list of call sources such that special handling may be applied to future calls from the call source. Such an indication may be generated, for example, through use of the notification interfaces 200 and 300 of FIGS. 2 and 3.

Figure 6A:
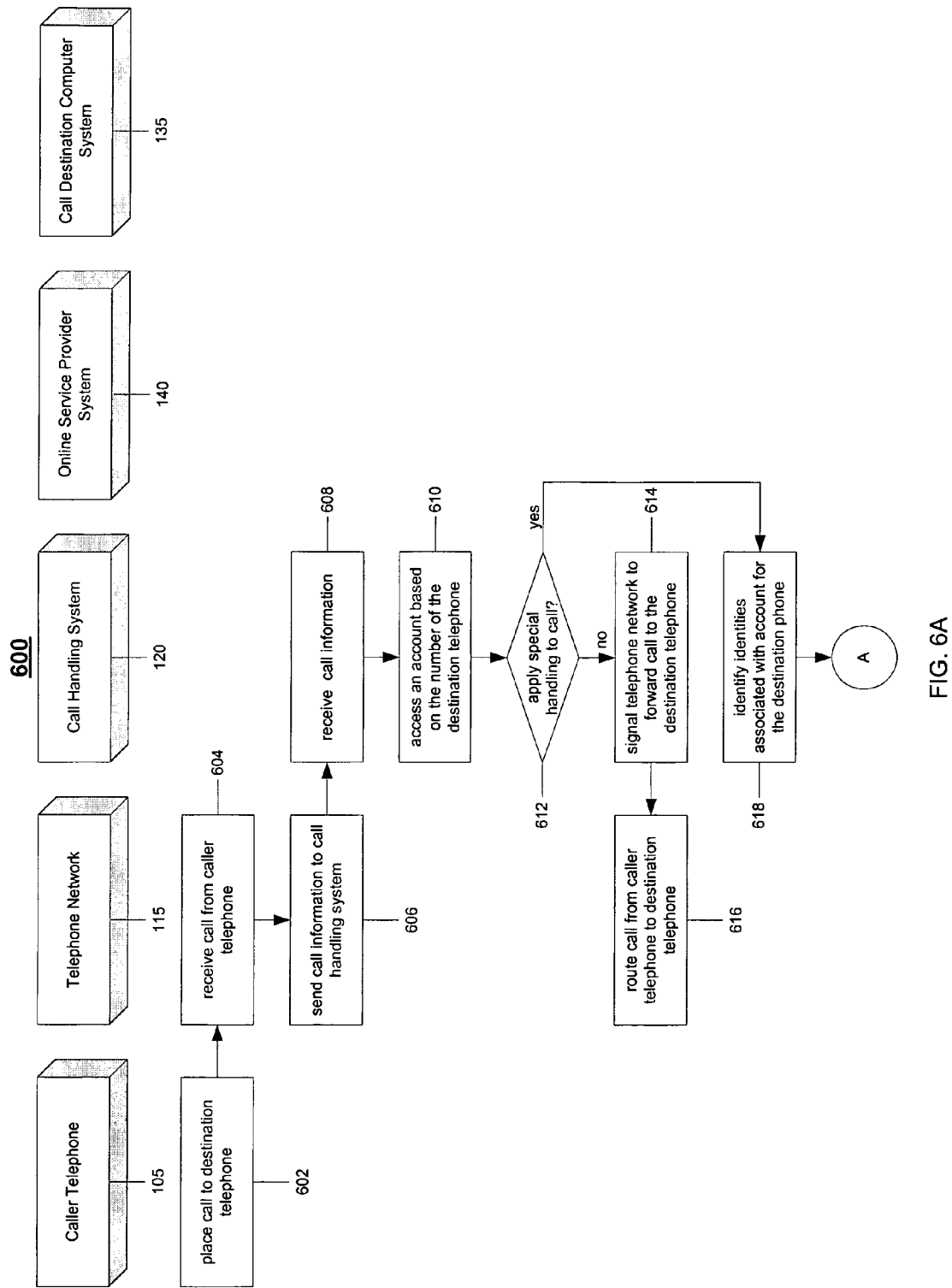
FIGS. 6A-6C provide a flow chart of a process for handling a call to a user for whom calls from undesirable sources are handled specially.
Figure 6B:
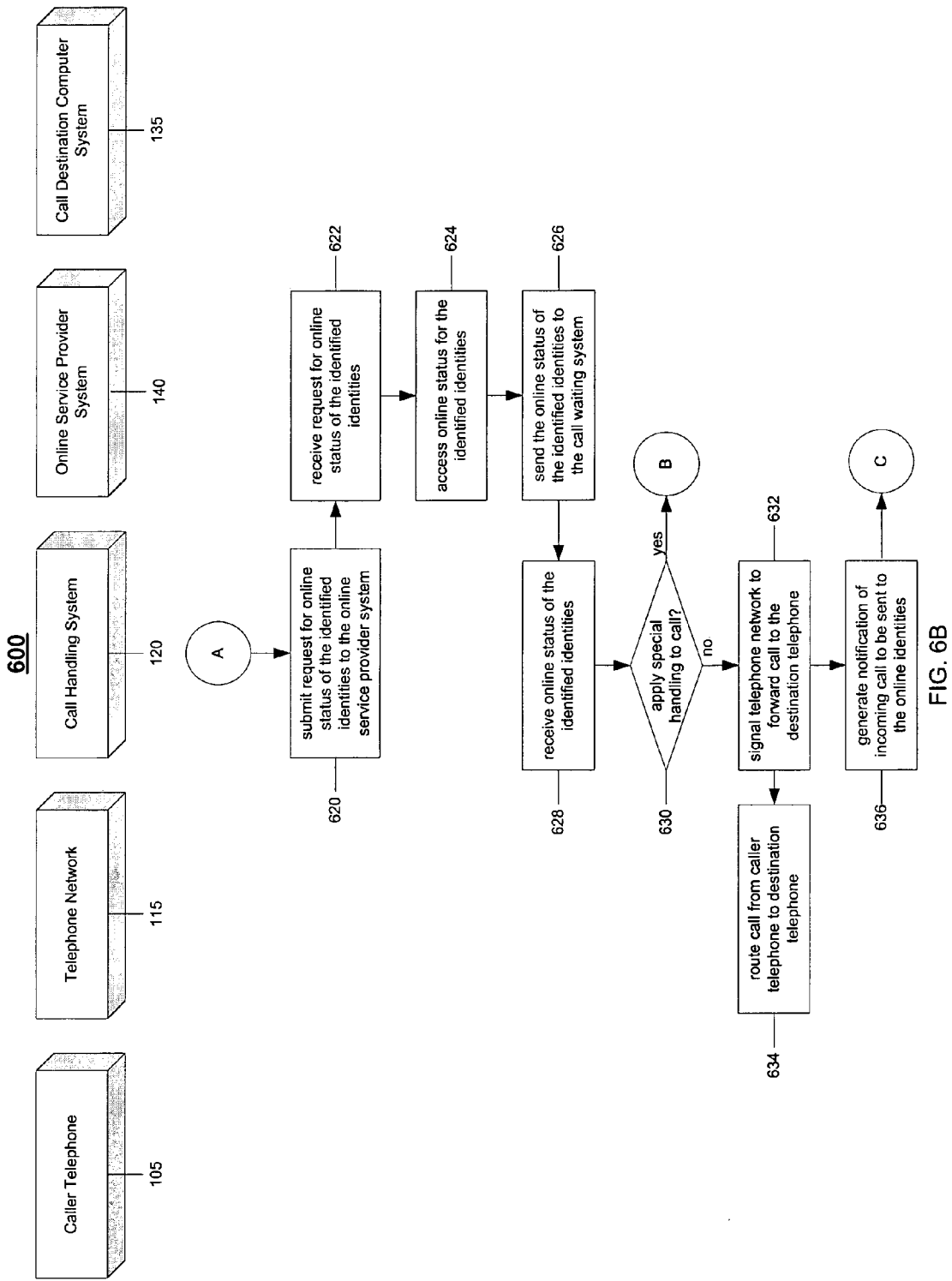
Figure 6C:
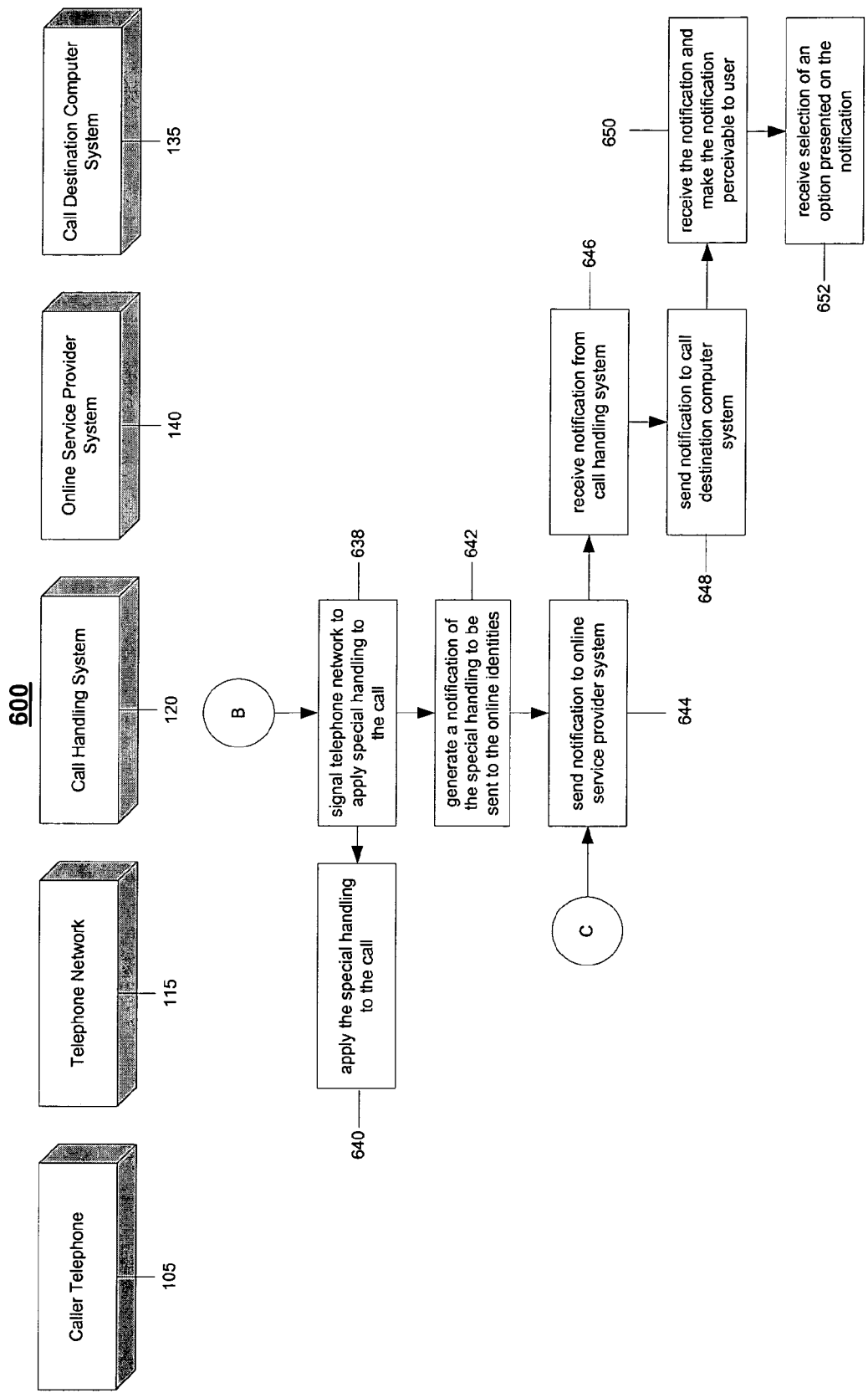

Referring to FIGS. 6A-6C, a process 600 is used for handling a call to a call recipient for which calls from undesirable sources are handled specially. For convenience, particular components described with respect to FIG. 1 are referenced as performing the process 600. More particularly, the process 600 involves a caller telephone 105, a telephone network 115, a call handling system 120, an online service provider system 140, and a call destination computer system 135. However, similar methodologies may be applied in other implementations where different components are used to define the structure of the system, or where the functionality is distributed differently among the components shown by FIG. 1. For example, similar methodologies may be applied in implementations where the call handling system 120 is integrated into the online service provider system 140.

A user of the caller phone 105 places a call to the destination telephone by dialing the number of the destination telephone (602). The telephone network 115 receives the call from the caller telephone 105 (604) and sends information describing the call to the call handling system 120 (606), which receives the call information (608). The call information may be sent to the call handling system 120 over a signaling channel, and may include a phone number of the destination of the call, and a time and date when the call was initiated.

The call handling system 120 identifies and accesses an account based on the number of the destination telephone (610). The account may be identified, for example, by accessing an account record stored in a configuration or registration data store and indexed by telephone number. The call handling system 120 determines whether special handling is to be applied to the call (612). The determination may be based on the accessed account. More particularly, the accessed configuration information may include preferences that indicate whether special handling should be applied to the call. Alternatively or additionally, the accessed registration information may indicate whether the destination telephone has registered for the special call handling.

If special handling is not to be applied to the call, then the call handling system 120 signals the telephone network 115 to forward the call to the destination telephone (614). The call handling system 120 may send the signal over the signaling channel. In response to the signal, the telephone network 115 routes the call from the caller telephone 105 to the destination telephone (616). To do so, the telephone network 115 may construct or redirect a voice path from the caller telephone 105 to the destination telephone.

If special handling is to be applied to the call, then the call handling system 120 identifies identities associated with the accessed account (618). In one implementation, the identities associated with the account are stored in the previously accessed account record. The call handling system 120 sends a request to the online service provider system 140 for the online status of the identified identities (620).

The online service provider system 140 receives the request for the online status of the identified identities (622) and accesses the online status of the available identities (624). The online status of the identities may be stored, for example, in a presence data store that is constantly updated in real-time in a manner similar to that used in instant messaging systems to reflect activity of a user at the call destination computer system 135. The online service provider system 140 sends the online status of the available identities to the call handling system 120 (626), which receives the online status of the identified identities (628).

The call handling system 120 determines whether special handling should be applied to the call (630). More particularly, the call handling system 120 determines whether the caller telephone 105 is included in the list of call sources whose calls are specially handled. In addition, the call handling system 120 may determine whether people and times associated with the call source in the list correspond to the people and times for which the special handling will be applied to the call.

If the call handling system 120 determines that special handling is not to be applied to the call (630), then the call handling system 120 signals the telephone network 115 to forward the call to the destination telephone (632), and the telephone network 115 routes the call from the caller telephone 105 to the destination telephone in the manner discussed above (634). The call handling system 120 may send the signal to the telephone network 115 over the signaling channel. Before signaling the telephone network 115 to forward the call, the call handling system 120 may associate additional information with the call. The call handling system 120 also generates a notification of the incoming call to be sent to the identified identities that are currently online (636). The notification may include the additional information that was associated with the call. If none of the identified identities are online, then no notifications are generated.

If the call handling system 120 determines that special handling is to be applied to the call (630), the call handling system 120 signals the telephone network 115 to apply the special handling to the call (638), and the telephone network 115 applies the special handling (640). The call handling system 120 may specify the special handling by sending call handling instructions over the signaling path to the telephone network 115, and the telephone network 115 may process the call handling instructions to apply the special handling to the call. Applying the special handling may include constructing or redirecting a voice path from the caller telephone 105 to the destination telephone.

Before signaling the telephone network 115 to forward the call, the call handling system 120 again may associate additional information with the call. The call handling system 120 also generates a notification of the incoming call to be sent to the identified identities that are currently online (642). The notification may include the additional information that was associated with the call. If none of the identified identities are online, then no notifications are generated.

The notifications that were generated by the call handling system 120 are sent to the online service provider system 140 (644), and the online service provider system 140 receives the notifications from the call handling system 120 (646). The notifications typically are sent out in parallel by the call handling system 120 to minimize transmission delays and arrival time differences between the notifications. The online service provider system 140 distributes the notifications to the identified identities that were previously determined to be online.

The online service provider system 140 sends the notifications to the call destination computer systems 135 corresponding to the online identities (648). Prior to doing so, the online service provider system 140 may associate format data with the notification that specifies how the notification is displayed on the call destination computer systems 135. The sending and receiving of the notifications and format data occur in real time. The call notification messages typically are sent out in parallel by the online service provider system 140 to minimize transmission delays and arrival time differences between call destination computer systems 135.

The call destination computer system 135 receives a notification and makes the notification perceivable to a user of the call destination computer system (650). In one implementation, the call destination computer system 135 enables the user to perceive the notification as a pop-up window or dialog box that appears on a visual display of the call destination computer system 135. The user may select an option presented on the displayed notification, and the call destination computer system 135 receives the selection of the option from the user (652).

Figure 7B:
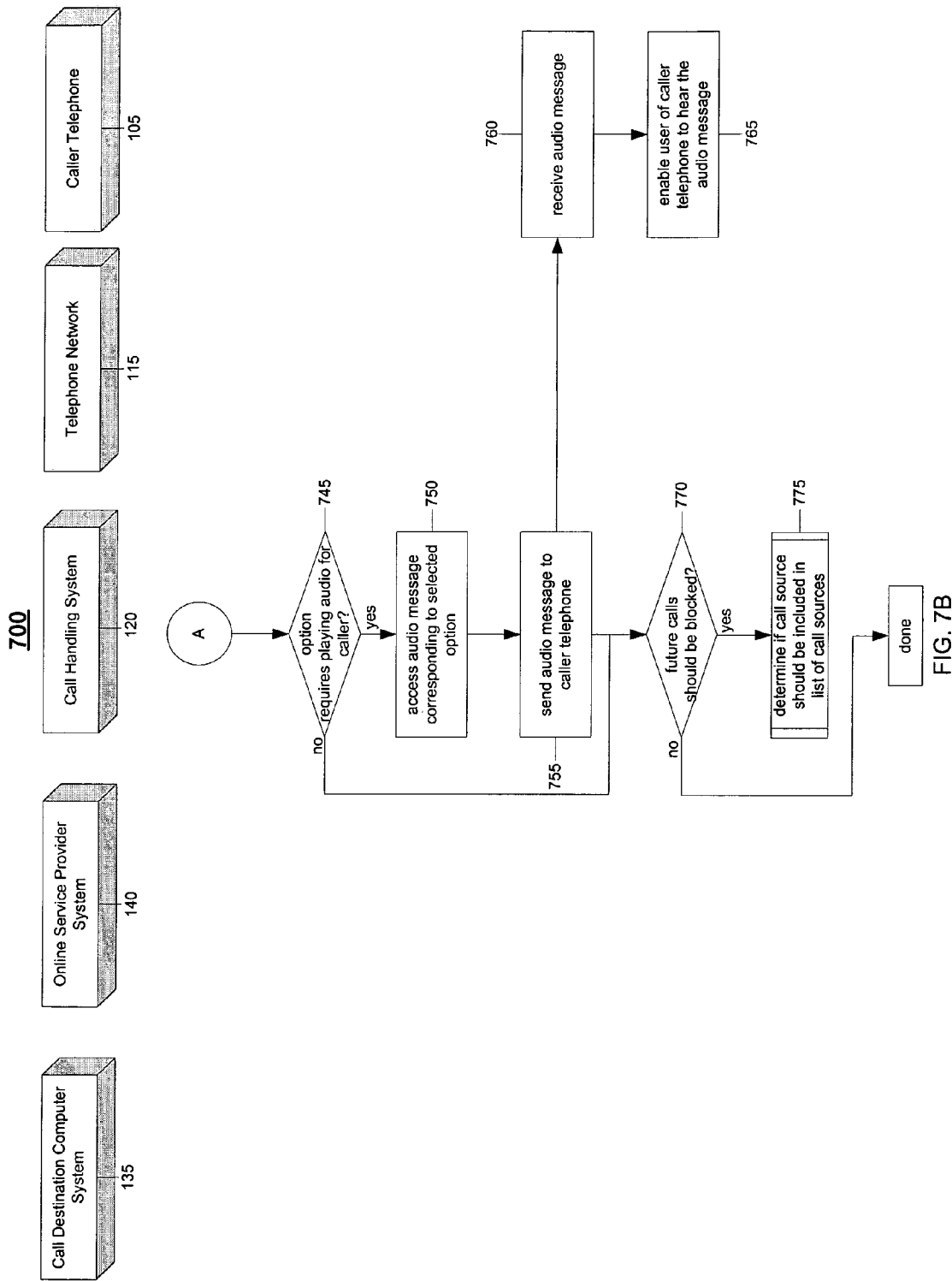

Referring to FIGS. 7A and 7B, a process 700 is used for handling a call based on the selection of an option from a notification of the call, such as the notification interfaces 200 and 300 of FIGS. 2 and 3. For ease of discussion, particular components described with respect to FIG. 1 are referenced as performing the process 700. More particularly, the process 700 includes a call destination computer system 135, an online service provider system 140, a call blocking system 125, a telephone network 115, and a caller telephone 105. However, similar methodologies may be applied in other implementations where different components are used to define the structure of the system, or where the functionality is distributed differently among the components shown by FIG. 1.

The call destination computer system 135 enables a user to select an option offered in the notification (705). In one implementation, the call destination computer system 135 may enable selection of the option prior to expiration of a predetermined time interval (e.g., 15 seconds). The call destination computer system 135 sends the selected option to the online service provider system 140 (710). The online service provider system 140 receives the selected option from the call destination computer system 135 (715), and sends the selected option to the call handling system 120 (720). The online service provider system 140 may do so in real time.

The call handling system 120 receives the selected option (725). The call handling system 120 then determines whether the selected option includes a call handling instruction (i.e., an instruction to forward or ignore the call) (730). If the selected option includes a call handling instruction, the call handling system 120 sends the call handling instruction to the telephone network 115 (735). The call handling instruction may be sent over a signaling channel to the telephone network 115. The telephone network 115 receives and processes the call handling instruction (740). The telephone network 115 may forward or redirect a voice path of the call, if required by the call handling instruction.

The call handling system 120 determines if the selected option requires playing an audio message for a caller that placed the call (745). If the selected option requires an audio message to be played, the call handling system 120 accesses the audio message corresponding to the selected option (750) and sends the accessed audio message to the caller telephone 105 through the telephone network (755). The audio message may be sent to the caller telephone 105 over a voice path through the telephone network 115. The caller telephone 105 receives the audio message (760) and enables a user to hear the audio message (765). In some implementations, the audio message may be identified and sent to the caller telephone 105 before the call handling instruction is identified and processed.

The call handling system 120 determines whether future calls from a source of the call for which the process 700 is executing should be blocked (770). The selected option may indicate that future calls from the call source should be blocked. More particularly, the user of the call destination computer system 135 may select the selected option to reflect a desire to block future calls from the call source. If future calls are to be blocked, then the call handling system 120 determines if the call source should be added to a list of call sources whose calls receive special handling (775). The call handling system 120 may do so through execution of the process 400 of FIG. 4.

Figure 8:
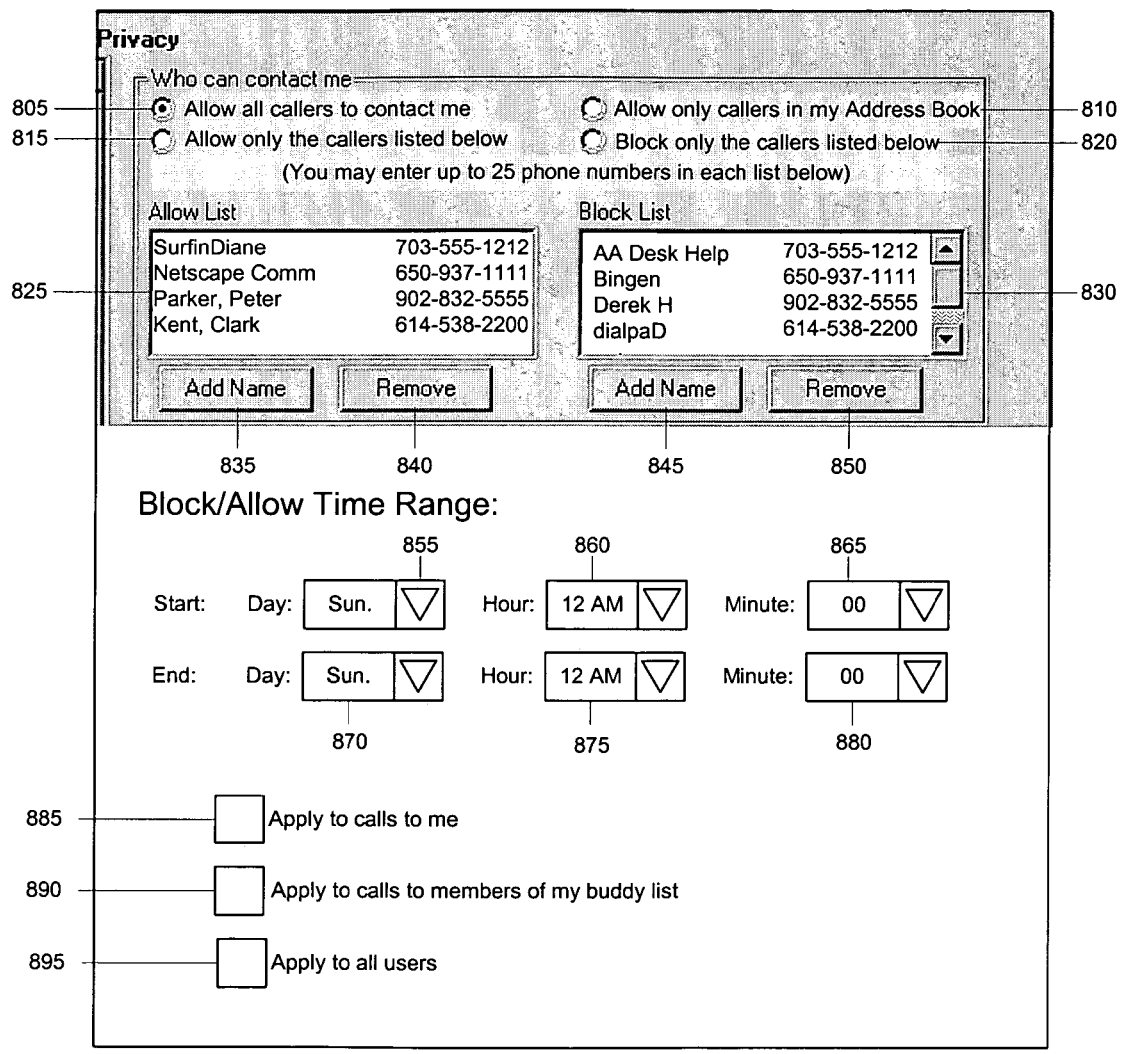
FIG. 8 is an illustration of an interface for manually specifying a list of call sources for which calls are specially handled.

Referring to FIG. 8, a call handling interface 800 is used to specify how calls from undesirable call sources are handled. The undesirable call sources are specified in a list of such call sources, such as the call source list 125 of FIG. 1. The call handling interface 800 enables a user to indicate times at which calls from the call sources are handled and people for whom calls from the undesirable call sources are handled. The call handling interface 800 includes call handling options 805-820, a desirable call source list 825, an undesirable call source list 830, call source list controls 835-850, time options 855-880, and people options 885-895.

The call handling options 805-820 enable the selection of a list of undesirable call sources such that special handling may be applied to calls from the undesirable call sources. For example, the option 805 indicates that special handling is not to be applied to any calls is 5 because no undesirable call sources exist. The option 810 indicates that the special handling should be applied to all calls from call sources not included in an address book of the user of the call handling interface 800. More particularly, a list of undesirable call sources that includes all call sources not included in the user's address book may be selected with the option 810.

The option 815 indicates that the special handling should be applied to all calls from call sources that are not included in the desirable call source list 825. In other words, a list of undesirable call sources that includes all call sources not included in the desirable call source list 825 may be selected with the option 815. The desirable call source list 825 is a list of call sources whose calls are not to receive the special handling. The desirable call source list 825 may be specified manually by the user of the call handling interface 800. For example, the desirable call source list 825 may be modified with the call source list controls 835 and 840. More particularly, an addition control 835 enables the addition of a desirable call source to the desirable call source list 825, and a removal control 840 removes a selected call source from the desirable call source list 825.

The option 820 indicates that the special handling should be applied to all calls from call sources that are included in the undesirable call source list 830. The undesirable call source list 830 is a list of call sources whose calls are to receive the special handling. The undesirable call source list 830 may be specified manually by the user of the call handling interface 800 or through execution of the process 400 of FIG. 4. For example, the undesirable call source list 830 may be modified with the call source list controls 845 and 850. More particularly, an addition control 845 enables the addition of an undesirable call source to the undesirable call source list 830, and the removal control 850 removes a selected call source from the undesirable call source list 830.

The time options 855-880 enable the specification of a time range during which special call handling is applied to the undesirable call sources identified by the call handling options 805-820. For example, if the options 805-820 indicate that special handling is to be applied to calls from call sources in the undesirable call source list 830, then special handling is applied to calls from call sources in the undesirable call source list 830 during the time range indicated by the time options 855-880. The time options 855-865 enable the specification of a start time of the range, and the time options 870-880 enable the specification of the end time. More particularly, the day of the week of the start time is specified with the option 855, the hour with the option 860, and the minute with the option 865. Similarly, the day of the week of the end time is specified with the option 870, the hour with the option 875, and the minute with the option 880. In some implementations, the time options 855 may be used to specify multiple ranges during which the call handling is applied or withheld, and to apply different ranges to different call sources.

The people options 885-895 enable the specification of people for whom special call handling is applied to calls from the undesirable call sources identified by the call handling options 805-820. More particularly, the option 885 causes the specified call handling to be applied to calls to the user of the call handling interface 800 when selected. The option 890 causes the specified call handling to be applied to calls to members in a contact list maintained by the user, such as a buddy list of an instant messaging system. The option 895 causes the specified call handling to be applied to calls to all possible users. When option 890 or 895 is selected, users on the user's buddy list (when option 890 is selected) or all users (when option 895 is selected) may be given the option to opt in or opt out with respect to having their calls handled based on the user's configuration of the interface 800.

Other people options are possible to enable the specification of other people or groups of people for whom the specified call handling is applied. In one implementation, one of the people options 885-895 must be selected, such that the specified call handling is applied to at least one person.

Figure 9:
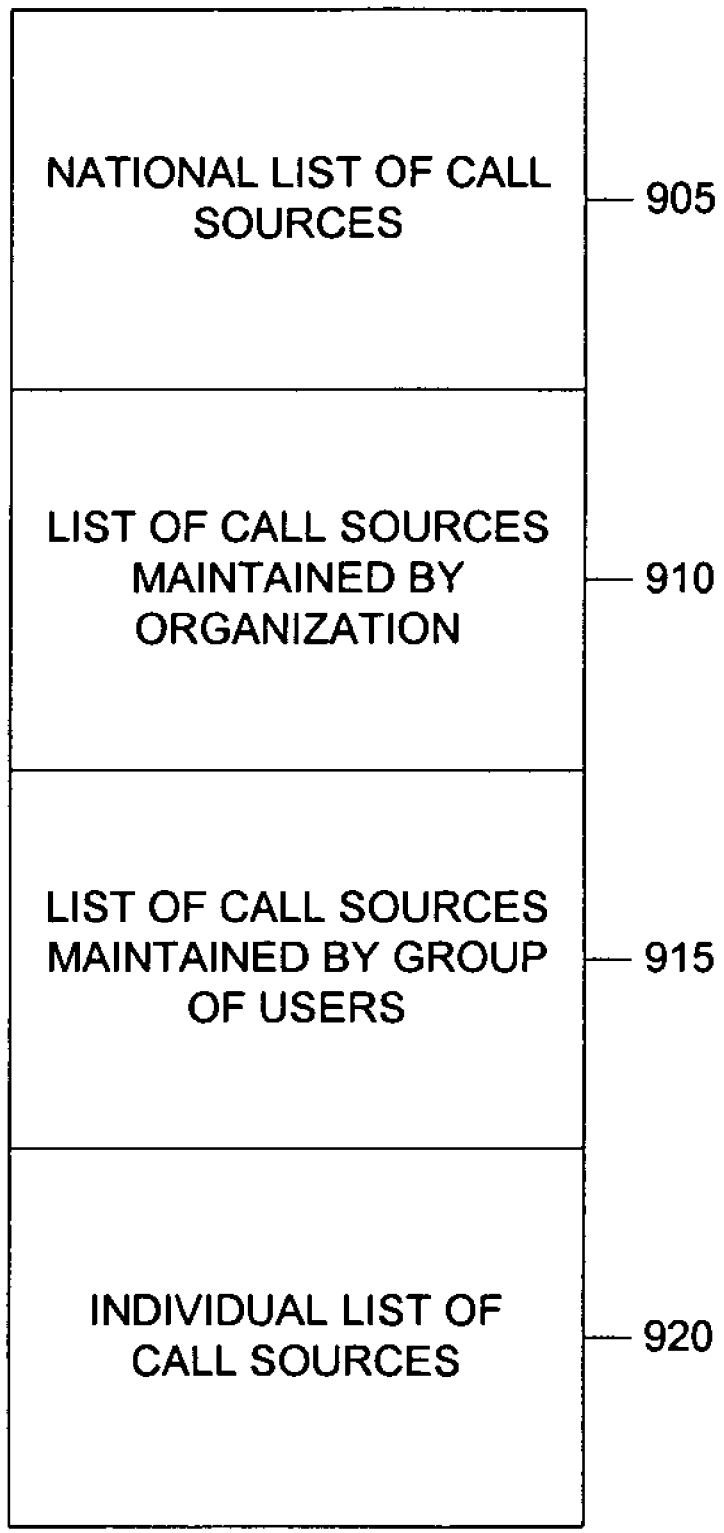
FIG. 9 is a block diagram of a list of call sources whose calls are specially handled.

Referring to FIG. 9, the call source list 125 includes multiple categories 905-920. More particularly, the call source list 125 may include a national category 905, an organization category 910, a group category 915, and an individual user category 920. Each of the categories 905-920 includes one or more identifiers of call sources whose calls are to receive special handling. More particularly, calls from a call source included in a particular category receive special handling only when the calls are placed to users corresponding to the particular category. The call source list 125 may apply to multiple users.

The national category 905 includes sources of calls to which special handling is applied for a global set of users. More particularly, special handling is applied to calls from a call source included in the national category 905 for users corresponding to one or more of the categories 910-920 of the call source list 125. The call sources included in the national category 905 may be suggested for addition by the corresponding users. The national category 905 may correspond to the National Do Not Call Registry or some other similar service that maintains a list of known call sources from which undesirable calls are received or of users that do not desire to receive future calls from the known call sources. Special handling may be applied to calls from a call source included in the national category 905 that are placed to a particular user even though the particular user did not indicate a desire to have special handling applied to calls from the call source.

The organization category 910 includes call sources whose calls are to receive special handling when placed to a member of a particular organization. The particular organization may be a company, a business, or an Internet service provider (ISP). The call sources included in the organization category 910 may be suggested for addition by a member of the organization, such as an employee, a customer, a subscriber, or a user of the organization, using for example, the option 895 of the interface 800. Special handling may be applied to calls from a call source included in the organization category 910 that are placed to a particular member of the organization even though the particular member did not indicate a desire to have special handling applied to calls from the call source. An entry may be placed in the organization category 910 (or the group category 915) only after a threshold number of users in the organization or group has indicated a desire for the call source corresponding to the entry to be placed on the list.

The group category 915 includes call sources whose calls are to receive special handling when placed to a member of a particular group. The group may be a group of people from the organization corresponding to the organization category 915. For example, the group may be a group of employees, customers, subscribers, or users of the organization. Alternatively or additionally, the group may be a group that is not related to the organization, such as a family, a group of friends, or a group of people included in a contact list. The call sources included in the group category 915 may be suggested for addition by a member of the group using, for example, the option 890 of the interface 800. Special handling may be applied to calls from a call source included in the group category 915 that are placed to a particular member of the group even though the particular member did not indicate a desire to have special handling applied to calls from the call source.

The individual user category 920 includes call sources whose calls are to receive special handling when placed to a particular individual. The individual may be a member of the organization corresponding to the organization category 910 or a group corresponding to the group category 915. The call sources included in the individual user category 920 are added to the individual user category 920 by the particular individual using, for example, the option 885 of the interface 800.

In one implementation, the call source list 125 may include multiple individual user categories 920, multiple group categories 915, multiple organization categories 910, and a single national category 905. In such a case, the call source list 125 may apply to all possible users. More particularly, the call source list 125 may include one individual user category 920 for each of the possible users. The call source list 125 also may include a group category 915 for each of the groups to which the possible users belong, and an organization category 910 for each of the organizations to which the possible users belong. Therefore, each of the possible users corresponds to one of the individual user categories 920 and the single national category 905, and may correspond to one or more of the group categories 915 and one or more of the organization categories 910. Special handling may be applied to calls to each of the possible users based on the presence of sources of the calls in categories of the call source list 125 that apply to the user.

In another implementation, the call source list 125 may be constructed for a single user and may include one or more of each of the categories 905-920. More particularly, the call source list 125 may include one individual user category 920 for the single user, a copy of each of the group categories 915 that correspond to groups that include the single user, a copy of each of the organization categories 910 that correspond to organizations that include the single user, and a copy of the national category 905. As a result, maintaining individual call source lists 125 may result in redundant maintenance of instances of the categories 905-920.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method for handling an incoming call from a call source, the method comprising:

electronically receiving an indication of a call placed to a call recipient;

electronically identifying a source of the call;

electronically determining if the identified call source is included in a first set of call sources, a second set of call sources, or a third set of call sources;

electronically applying a first call treatment to the call when the identified call source is determined to be included in the first set of call sources; and electronically applying a second call treatment to the call when the identified call source is determined to be included in the second set of call sources; and electronically applying a third call treatment to the call when the identified call source is determined to be included in the third set of call sources, the first, the second, and the third call treatments being distinct from each other, wherein the call source is included in the first set of call sources when a number of received indications is zero, said indications reflect a desire of corresponding call recipients to block future calls from the call source, wherein the call source is included in the second set of call sources when a number of said indications is greater than zero but less than a threshold number, and wherein the call source is included in the third set of call sources when a number of said indications is greater than or equal to the threshold number.

2. The method of claim 1, wherein:

electronically applying the first call treatment comprises causing the call to ring on a phone of the call recipient using a first ring tone, electronically applying the second call treatment comprises causing the call to ring on the phone of the call recipient using a second ring tone, and electronically applying the third call treatment comprises causing the call to ring on the phone of the call recipient using a third ring tone, the first, the second and the third ring tones being different from each other.

3. The method of claim 1, wherein:

electronically applying the first call treatment comprises providing a first visual notification of the call to the call recipient, electronically applying the second call treatment comprises providing a second visual notification of the call to the call recipient, and electronically applying the third call treatment comprises providing a third visual notification of the call to the call recipient, the first, the second and the third visual notifications being visually distinct from each other.

4. The method of claim 3, wherein the first visual notification is presented in a first color, the second visual notification is presented in a second color, and the third visual notification is presented in a third color, the first, the second and the third colors being distinct from each other to reflect inclusion of the call source in the first, the second, and the third sets of call sources, respectively.

* * * * *